(12) United States Patent
Janeke (10) Patent No.: US 10,279,932 B2
(45) Date of Patent: May 7, 2019

(54) SYSTEM, APPARATUS AND METHODS FOR A NOSECONE AND A PROPULSIVE NOZZLE OF AN AIRSPACE PLANE

(71) Applicant: Charl Emelio Janeke, Los Angeles, CA (US)

(72) Inventor: Charl Emelio Janeke, Los Angeles, CA (US)

( * ) Notice: Subject to any disclaimer, the term of this patent is extended or adjusted under 35 U.S.C. 154(b) by 308 days.

(21) Appl. No.: 15/414,480

(22) Filed: Jan. 24, 2017

(65) Prior Publication Data

US 2017/0275028 A1    Sep. 28, 2017

Related U.S. Application Data

(63) Continuation-in-part of application No. 15/083,128, filed on Mar. 28, 2016, now Pat. No. 9,550,586.

(51) Int. Cl.
| | |
|---|---|
| *B64G 1/62* | (2006.01) |
| *F42B 15/34* | (2006.01) |
| *F42B 10/38* | (2006.01) |
| *F42B 10/46* | (2006.01) |
| *F42B 12/02* | (2006.01) |

(52) U.S. Cl.
CPC ............... *B64G 1/62* (2013.01); *F42B 10/38* (2013.01); *F42B 10/46* (2013.01); *F42B 12/02* (2013.01); *F42B 15/34* (2013.01)

(58) Field of Classification Search
CPC .... B64G 1/62; F25J 3/027; F25D 3/10; F42B 10/38; F42B 15/34
USPC ........................................................ 244/130
See application file for complete search history.

(56) References Cited

U.S. PATENT DOCUMENTS

| | | | | |
|---|---|---|---|---|
| 3,745,832 | A * | 7/1973 | Johnson | B04B 5/00 73/1.87 |
| 4,778,130 | A * | 10/1988 | Kim | B64C 30/00 244/117 A |
| 9,550,586 | B2 * | 1/2017 | Janeke | F42B 10/46 |
| 2005/0000383 | A1 * | 1/2005 | Facciano | F42B 10/46 102/377 |
| 2013/0213481 | A1 * | 8/2013 | Drayna | F02K 7/14 137/1 |
| 2015/0336659 | A1 * | 11/2015 | Zhong | B64C 21/10 244/130 |
| 2015/0375125 | A1 * | 12/2015 | Lurie | A63G 31/00 472/49 |

* cited by examiner

*Primary Examiner* — Christopher P Ellis
(74) *Attorney, Agent, or Firm* — J. Curtis Edmondson; Law Offices of J. Curtis Edmondson (57) ABSTRACT

A system, apparatus and method for mitigating the shock front of a rocket or aerospace plane flying at hypersonic speeds while simultaneously distilling liquid chemical elements regeneratively from the ambient air by means of vortex inversion splines. The splines may additionally be tuned by geometry to function as both centripetal and/or isentropic thrust augmentation attribute and/or double-decker Joule-Thomson refrigeration means. Because of the stochastic stagnation flux that reaches into the absolute zero zone by means of precooling, a splined stochastically switched hypersonic nosecone may be constructively tuned into a complex Carnot refrigeration engine commanding both personal and enterprise liquid Helium distilling means with orders of magnitude efficacy gains over existing methods.

3 Claims, 10 Drawing Sheets

SYSTEM, APPARATUS AND METHODS FOR A NOSECONE AND A PROPULSIVE NOZZLE OF AN AIRSPACE PLANE

CROSS REFERENCE TO RELATED APPLICATIONS

The present application is Continuation in part of U.S. patent application Ser. No. 15/083,128 filed on Mar. 28, 2016, entitled as "Apparatus and Methods for a Hypersonic Stochastic Switch" and claims the benefit of U.S. Utility patent application Ser. No. 14/564,024, filed on Aug. 12, 2014 and entitled "Apparatus and Methods for Hypersonic Nosecone", U.S. Utility patent application Ser. No. 14/313,976, filed on Jun. 24, 2014 and entitled "Thermally Conductive Hypersonic Nosecones" and U.S. Provisional Patent Application No. 61/838,454, filed on Jun. 24, 2013 and entitled "Hypersonic Vortex Tube", which is herein incorporated by reference in its entirety.

BACKGROUND

This inventive subject matter relates to the systems, apparatus, and methods for the reduction of drag in a spacecraft or missiles. The reduction of drag in spacecraft and missiles is of particular concern as atmospheric friction can cause the nosecone to increase beyond the failure point. Clearly ways to reduce would benefit missiles, allowing them to travel at higher speeds, and spacecraft, allowing them to reenter the atmosphere without the fear of destruction. Also described are the details and means to transform an isentropically expanded hypersonic stochastic vortex flux (Z-plane singularity) back into isentropic (Y-plane) mode by means of (micro/planetary) splines that reset the hypersonic stochastic vortex flux back into a supersonic isentropic front by means of contra rotating micro or planetary splines.

SUMMARY

The inventive subject matter is about a thermally reactive nosecone mounted on a projectile for achieving hypersonic transport comprising: an incipient shockwave, the incipient shockwave being transformed into an isentropic flux via a stochastic switch. A core component of the thermally reactive nosecone is a stochastic switch (a singularity), which is the consequence of isothermal compression and/or hypersonic liquefaction and/or regenerative cooling and/or Joule-Thomson throttling and complex cryogenic Carnot refrigeration (triggered via sudden expansion and/or a porous plug integrated into the discharge end of the thermally reactive nosecone) whereby a linear continuum of the incipient shockwave is transformed into a gyrating perfectly random stochastic vortex/stagnation flux. In order to transform the stochastic vortex flux (back) into isentropic streamlines grooved isentropic splines (in the inside the discharge nozzle and/or peripheral of the nosecone of the nozzle of the thermally reactive nosecone) has been proposed in lieu of the porous plug triggering Joule-Thomson throttling and complex Carnot refrigeration simultaneously. In addition to Joule-Thomson throttling and complex Carnot refrigeration an extrinsic cryogenic resource may be applied to pre/sub cool the thermally reactive nosecone to supercharge the refrigeration power of the shockwave piercing stochastic switch. Liquid nitrogen and/or a liquid cryogenic propellant may be applied as the extrinsic cryogenic resource to supercharge the switching power of the shockwave thermally reactive shockwave piercing nosecone mounted on a projectile for achieving hypersonic transport. The thermally reactive nosecone may additionally be optimized for throttling and triggering complex Carnot refrigeration liquefaction of atmospheric oxygen to drive a rocket propulsion engine of a hypersonic transport.

In another embodiment of the invention the thermally reactive nosecone may be configured with an independent/freestanding isentropic hypersonic expansion nozzle to drive the thermally reactive nosecone as a cryogenic refrigeration apparatus wherein the isentropic hypersonic expansion nozzle of the thermally reactive nosecone is optimized to distill liquid helium. Liquid helium hydrogen in the range of 1-5% of helium may additionally be introduced into the isentropic expansion nozzle to boost the liquefaction capacity of liquid helium. The thermally reactive nosecone may be additionally configured as a (micro) personal and/or enterprise (scaled) freestanding thermally reactive nosecone to distill liquid helium directly distilled out of compressed helium by means of the addition of isentropic splines within an (hypersonic) expansion nozzle in addition to (tanked) liquid nitrogen to (1) precool and (2) refrigerate the expanded helium proximal to the saturation curve of helium at absolute zero.

In another embodiment the thermally reactive nosecone is coupled within the confinements of rocket missile and/or aerospace plane with a centripetal thrust augmentation nozzle whereby (1) the centripetal thrust augmentation nozzle is equipped with grooved (isentropic) splines that transform/switch the stochastic vortex flux (back) into isentropic streamlines and (2) whereby the grooved (isentropic) splines centripetal thrust augmentation nozzle is equipped with (enumerated) supersonic ram detonation (SURD) propulsive means in addition to grooved (isentropic) splines in isolation.

The inventive subject matter also comprises a system, apparatus and methods for a reduction of drag in a missile using a vortex tube as well as augmenting the thrust of a centripetal nozzle system with (micro) planetary splines.

In an embodiment is illustrated a method for reducing drag at hypersonic speed that includes the steps of mounting a liquefaction nosecone on the forward portion of a projectile; where the projectile is either a missile or spacecraft.

In another embodiment is described a method for reducing drag at hypersonic speed also having the steps of drawing an atmosphere external to the liquefaction nose cone an intake aperture or a discharge shaft.

In yet another embodiment is presented the details of a supersonic isentropic splines switching the stochastic hypersonic flux from the Z-plane back into the Y-plane to (1) maximize regenerative cooling of the shockwave piercing nosecone and (2) maximizing propulsive thrust augmentation of the stochastic or inversed centripetal supersonic ram detonation nozzle system.

This specification is not limited to a single embodiment, rather the methods and systems presented should be construed broadly and further incorporate the material presented in the drawings.

DETAILED DESCRIPTION

Persons skilled in the art will recognize that many modifications and variations are possible in the details, materials, and arrangements of the parts and actions which have been described and illustrated in order to explain the nature of this inventive concept and that such modifications and variations do not depart from the spirit and scope of the teachings and claims contained therein.

Figure 1A:
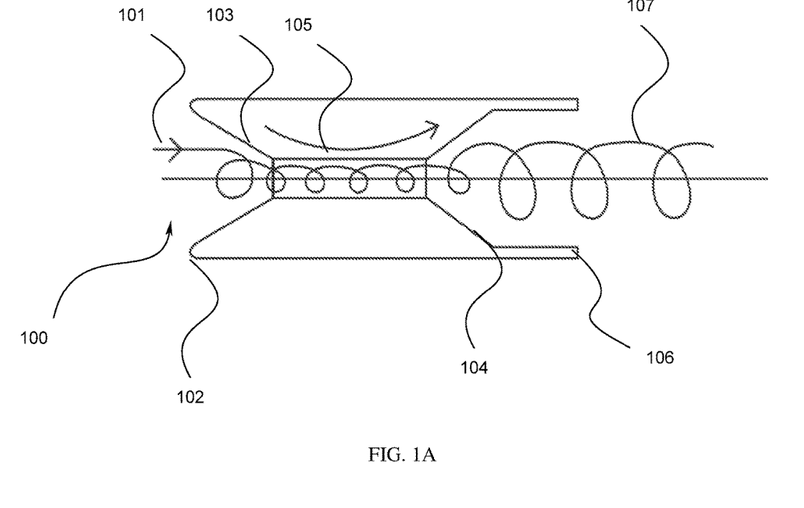
FIGS. 1A and 1B illustrates a stochastic regenerative hypersonic shockwave piercing nose cone.
Figure 1B:
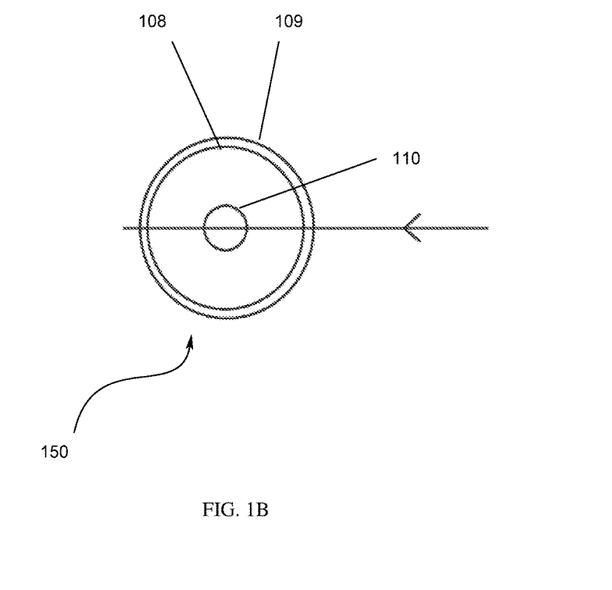

In an embodiment, FIG. 1A denotes a typical hypersonic system 100, wherein streamline 101 entering the funneled supersonic nosecone intake 102 is transformed into a hypersonic stochastic vortex flux 107 at contact 103 with the regenerative chilled slanted surface 105 in the cryogenic zone regenerative chilled via Joule-Thomson throttling/refrigeration 104 and hence exiting via nozzle aperture 106. Referring to FIG. 1B, which illustrates a cross-sectional view 150, depicting an outer nozzle, inner nozzle and shaft structure represented by 108/109 and shaft 110 respectively.

Figure 2A:
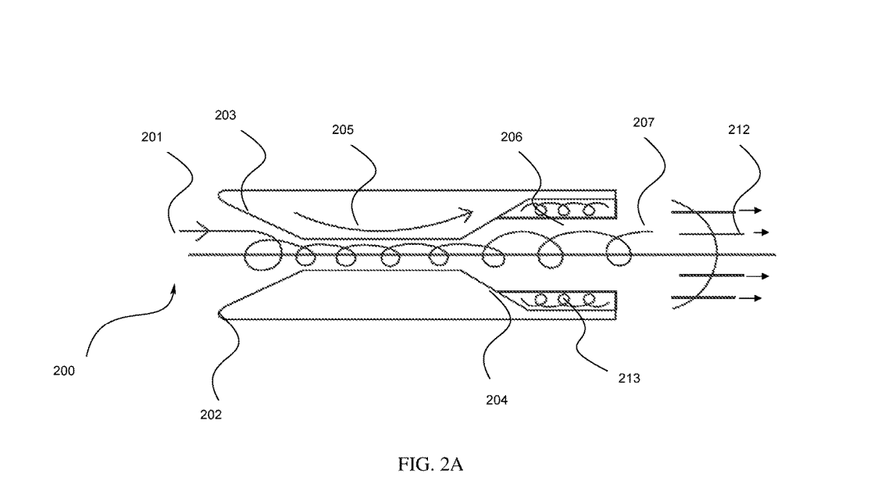
FIGS. 2A and 2B illustrates a stochastic regenerative hypersonic nose cone with annular splines in conjunction with the annular exit.
Figure 2B:
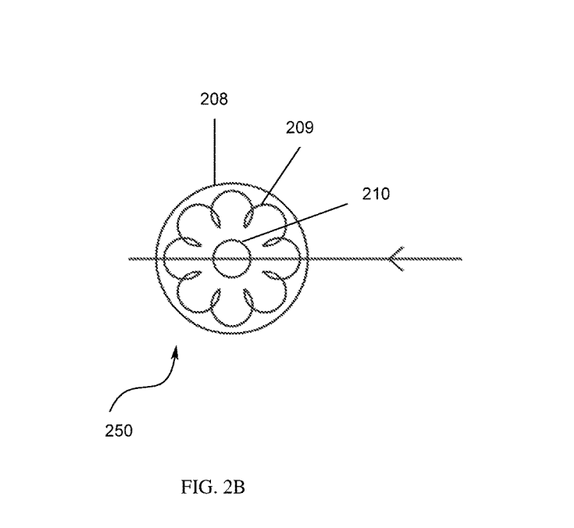

In an embodiment, FIG. 2A denotes a system 200, wherein hypersonic streamline 201 entering the funneled supersonic nosecone intake 202 whereupon being transformed into a hypersonic stochastic vortex flux 207 at contact 203 with the regenerative chilled slanted surface 205 in the cryogenic zone regenerative chilled via Joule-Thomson throttling/refrigeration 204 and hence exiting via the splined nozzle aperture 206 whereby the primary vortex 207 is being transformed into a numerocity of contrarotating micro spline vortices 213 that generates an isentropical transformed propulsive supersonic front 212 in accordance with the $2^{nd}$ law of thermodynamics (preservation of internal energy) whereby $dU=\delta Q+\delta W=\delta Q$ [with an isothermal (regenerative) cryogenic shockwave piercing nozzle system with $\delta W=0$] and $dU=\delta Q+\delta W=\delta W$ [with an adiabatic/ceramic lined (centripetal) thrust augmentation propulsive nozzle system with $\delta Q=0$]. Referring to FIG. 2B, which illustrates a cross-sectional view 250, depicting an outer nozzle, inner nozzle and shaft structure represented by 208/209 and shaft 210 respectively.

Figure 3A:
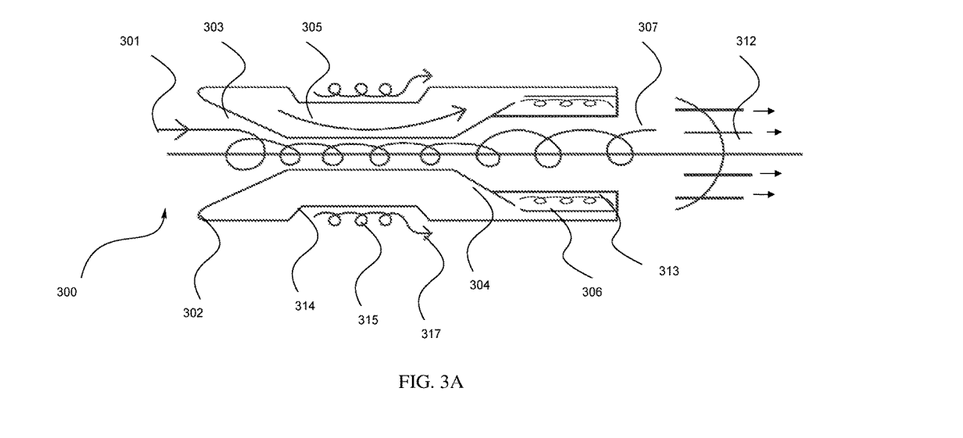
FIGS. 3A and 3B illustrates a stochastic regenerative hypersonic nose cone with both annular and peripheral splines in conjunction with the annular exit.
Figure 3B:
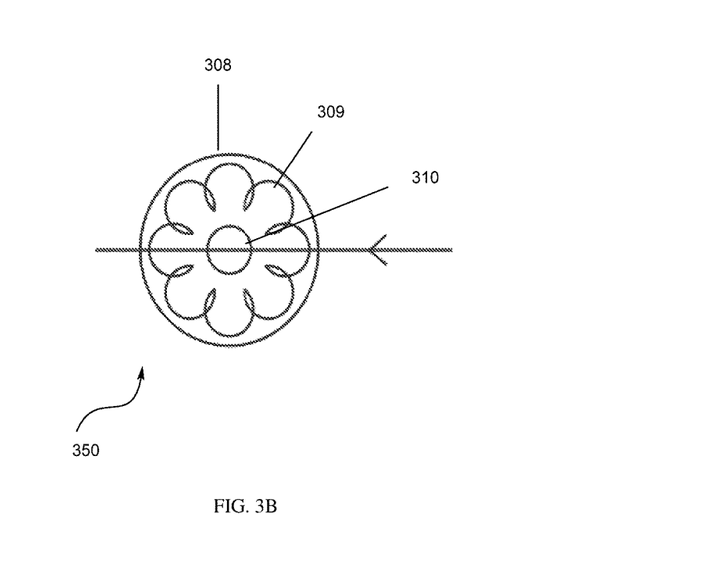

In an embodiment, FIG. 3 illustrates a system 300, wherein a hypersonic streamline 301 entering the funneled supersonic nosecone intake 302 whereupon being transformed into a hypersonic stochastic vortex flux 307 at contact 303 with the regenerative chilled slanted surface 305 in the cryogenic zone which is regeneratively chilled via Joule-Thomson throttling/refrigeration as a consequence of (1) sudden expansion of the core shaft 304 and (2) the (splined) nozzle apertures 306 whereby the primary vortex 307 is transformed into a numerocity of contrarotating (micro) SPLINE vortices 313 that generates the (ISENTROPICAL) transformed (propulsive) supersonic front 312 in accordance with the $2^{nd}$ law of thermodynamics (preservation of internal energy) whereby $dU=\delta Q+\delta W=\delta W$ given $\delta Q=0$. Likewise, the peripheral splines 314 transforms the peripheral vortex 315 into a numerocity of (micro) SPLINE vortices 317 in according to the $2^{nd}$ law of thermodynamics (preservation of energy) $dU=\delta Q+\delta W=\delta Q$ given $\delta W=0$ vis-a-vis. Referring to FIG. 3B, which illustrates a cross-sectional view 350, depicting an outer nozzle, inner nozzle and shaft structure represented by 308/309 and shaft 310 respectively.

Figure 4A:
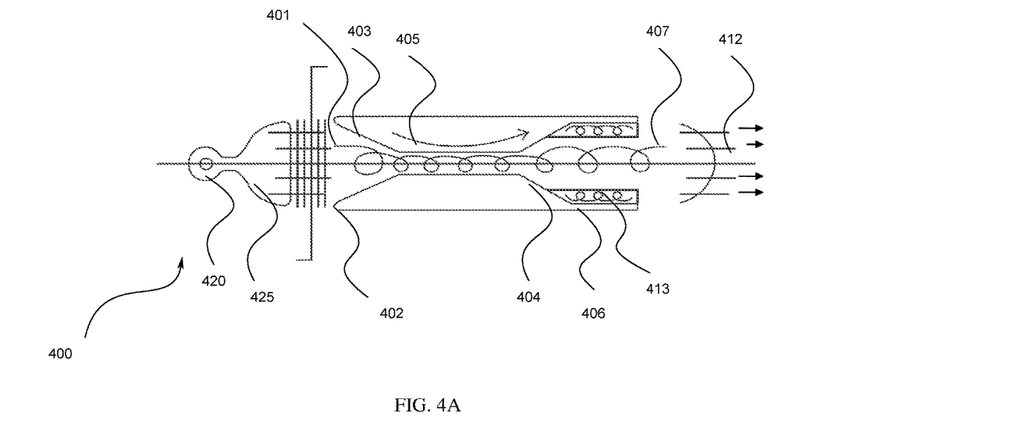
FIGS. 4A and 4B illustrates a stochastic regenerative hypersonic nose cone driven by a high pressure supersonic/isentropic expansion nozzle.
Figure 4B:
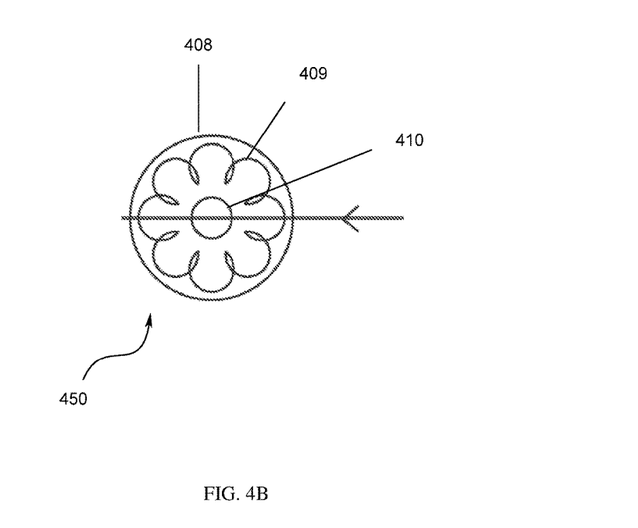

In an embodiment, FIG. 4 illustrates a system 400, wherein a hypersonic streamline 401 driven by high pressure hypersonic-isentropic expansion nozzle system 420/425 entering the funneled supersonic nosecone intake 402 whereupon being transformed into a hypersonic stochastic vortex flux 407 at contact 403 with the regenerative chilled slanted surface 405 in the cryogenic zone regenerative chilled via Joule-Thomson throttling/refrigeration within the sudden expansion 404 hence exiting via the internally splined nozzle aperture 406 whereby the primary vortex 407 is being transformed into a numerocity of contrarotating micro spline vortices 413 that generates the isentropical transformed supersonic front 412 according to the $2^{nd}$ law of thermodynamics (preservation of energy) whereby $dU=\delta Q+\delta W=\delta W$ given $\delta Q=0$. Referring to FIG. 4B, which illustrates a cross-sectional view 450, depicting an outer nozzle, inner nozzle and shaft structure represented by 408/409 and shaft 410 respectively.

Figure 5A:
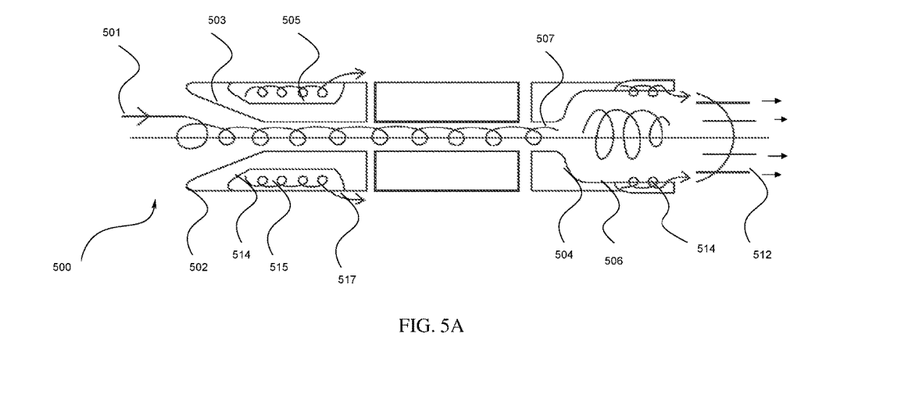
FIGS. 5A and 5B illustrates a hybrid aerospace plane with stochastic regenerative hypersonic nosecone in conjunction with an elemental splined centripetal thrust augmentation nozzle.
Figure 5B:
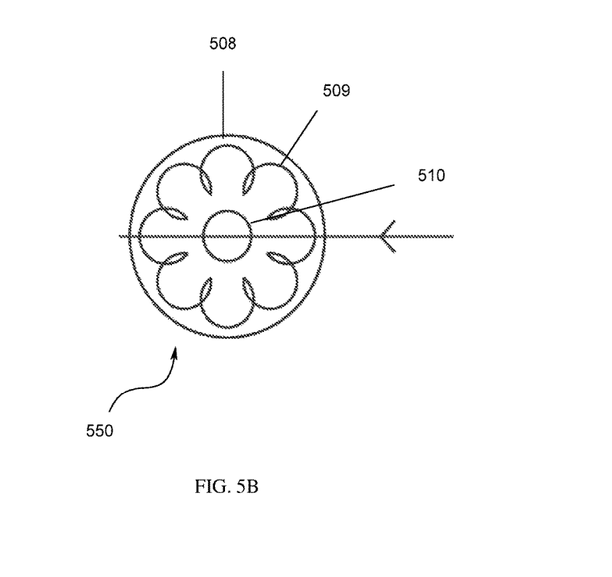

In an embodiment, FIG. 5 illustrates a system 500, wherein a hybrid aerospace plane with stochastic regenerative hypersonic nosecone (stochastic switch) in conjunction with an elemental splined centripetal thrust augmentation nozzle (isentropic switch) whereby a hypersonic streamline 501 enters the funneled (supersonic) nosecone intake 502 whereupon being transformed into a stochastic vortex flux 507 at contact 503 with the regenerative chilled slanted surface 505 in the cryogenic zone via Joule-Thomson throttling/refrigeration in accordance with the $2^{nd}$ law of thermodynamics (preservation of energy) whereby $dU=\delta Q+\delta W=\delta W$ given $\delta Q=0$ Likewise, the (funneled) vortex flux 507 is transformed into a numerocity of contrarotating (micro) SPLINE vortices 513 that generates the (isentropical) transformed (propulsive) supersonic front 512 in accordance with the $2^{nd}$ law of thermodynamics (preservation of internal energy) whereby $dU=\delta Q+\delta W=\delta W$ given $\delta Q=0$. Likewise, the peripheral splines 514 transforms the peripheral vortex 515 into a numerocity of micro spline vortices 517 in according to the $2^{nd}$ law of thermodynamics (preservation of energy) $dU=\delta Q+\delta W=\delta Q$ given $\delta W=0$ vis-a-vis. Referring to FIG. 5B, which illustrates a cross-sectional view 550, depicting an outer nozzle, inner nozzle and shaft structure represented by 508/509 and shaft 510 respectively.

Figure 6A:
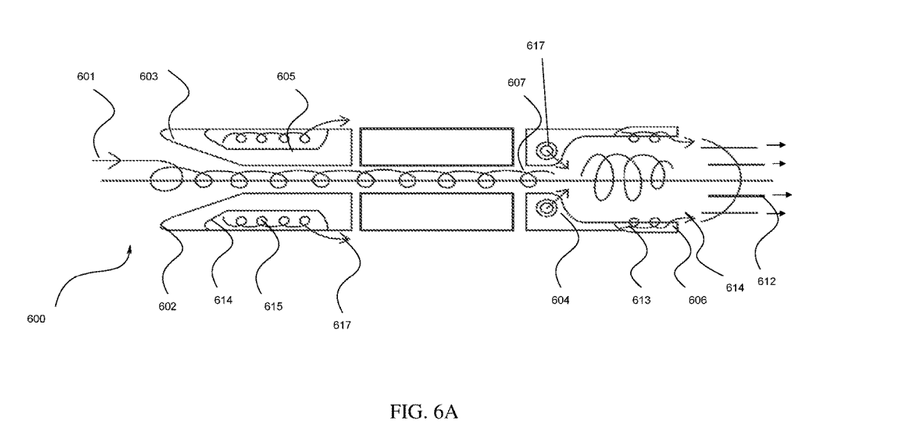
FIGS. 6A and 6B illustrates a hybrid aerospace plane with stochastic regenerative hypersonic nosecone in combination with an array of centripetal supersonic-detonation hypersonic Constellation propellant injectors in conjunction with splined annular exit.
Figure 6B:
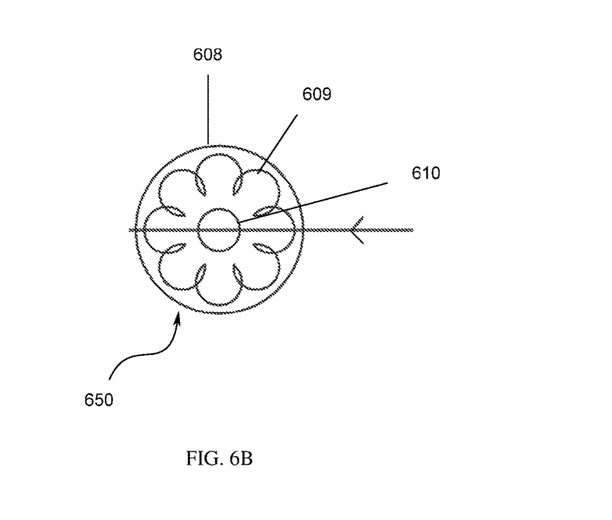

In an embodiment, FIG. 6 illustrates a system 600, wherein a hybrid aerospace plane with stochastic regenerative hypersonic nosecone (stochastic switch) in combination with an array of centripetal (supersonic-detonation) hypersonic (Constellation) propellant injectors in conjunction with splined annular exit (isentropic switch) whereby a hypersonic streamline 601 enters the funneled supersonic nosecone intake 602 whereupon being transformed into a stochastic vortex flux 607 at contact 603 with the regenerative chilled slanted surface 605 in the cryogenic zone via Joule-Thomson throttling/refrigeration in accordance with the $2^{nd}$ law of thermodynamics (preservation of energy) whereby $dU=\delta Q+\delta W=\delta W$ given $\delta Q=0$. Likewise, the funneled vortex flux 607 is transformed into a numerocity of contrarotating (micro) SPLINE vortices 613 driven by an array of hypersonic Constellation (micro) propellant injectors 617 that generates the (isentropical) transformed (propulsive) supersonic front 612 in accordance with the $2^{nd}$ law of thermodynamics (preservation of internal energy) whereby $dU=\delta Q+\delta W=\delta W$ given $\delta Q=0$. Likewise, the peripheral splines 614 transforms the peripheral vortex 615 into a numerocity of (micro) SPLINE vortices 617 in according to the $2^{nd}$ law of thermodynamics (preservation of energy) $dU=\delta Q+\delta W=\delta Q$ given $\delta W=0$ vis-a-vis. Referring to FIG. 6B, which illustrates a cross-sectional view 650, depicting an outer nozzle, inner nozzle and shaft structure represented by 608/609 and shaft 610 respectively.

Figure 7A:
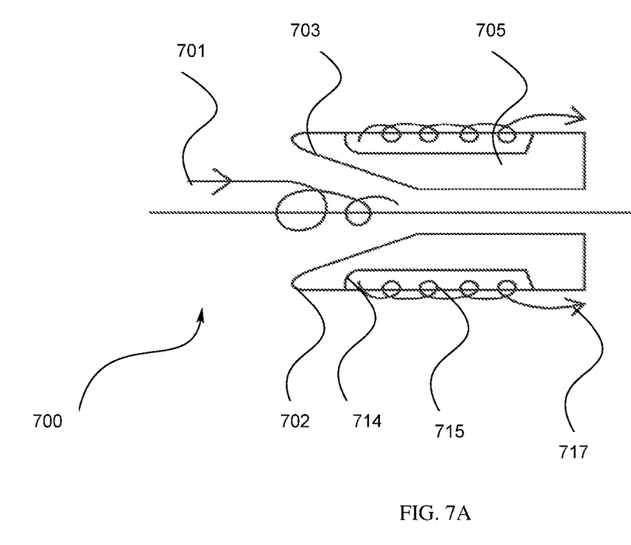
FIGS. 7A and 7B illustrates a stochastic regenerative hypersonic nose cone with both annular and peripheral spline cavities in conjunction with splined annular exit.
Figure 7B:
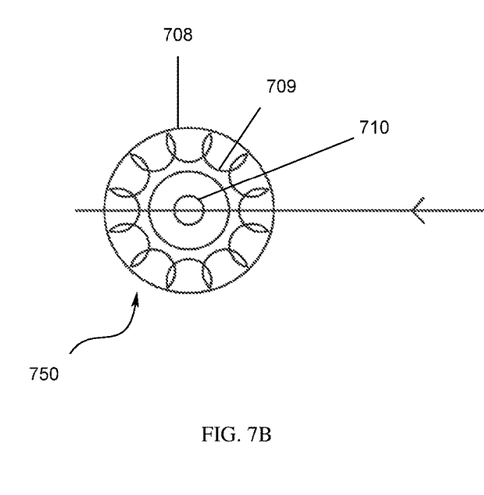

In an embodiment, FIG. 7 illustrates a system 700, which depicts a stochastic regenerative hypersonic nose cone whereby the hypersonic streamline 701 is transformed into a stochastic vortex flux at contact 703 with the regenerative chilled slanted surface 705 in the cryogenic zone which is (regeneratively) chilled via Joule-Thomson throttling/refrigeration. The peripheral splines 714 transforms the peripheral vortex 715 into a numerocity of (micro) spline vortices 715 in according to the $2^{nd}$ law of thermodynamics (preservation of energy) $dU=\delta Q+\delta W=\delta Q$ given $\delta W=0$ vis-a-vis. Referring to FIG. 7B, which illustrates a cross-sectional view 750, depicting an outer nozzle, inner nozzle and shaft structure represented by 708/709 and shaft 710 respectively.

Figure 8A:
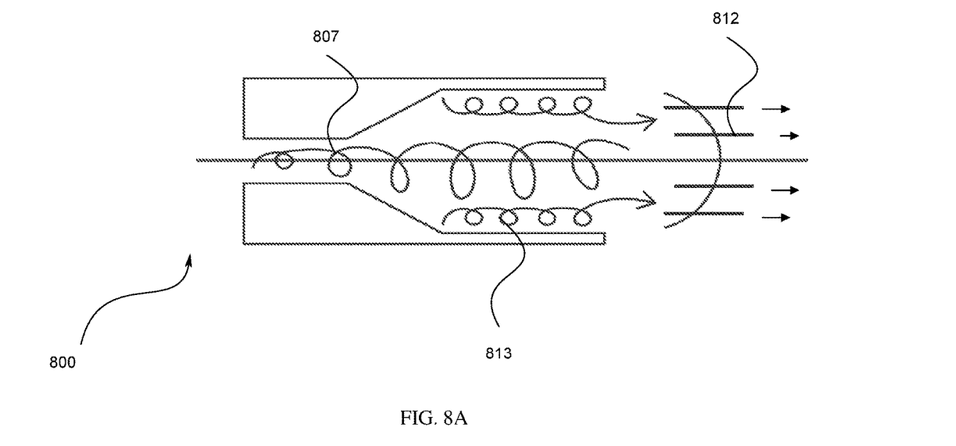
FIGS. 8A and 8B illustrates an elemental centripetal splined thrust augmentation nozzle in conjunction with splined annular exit.
Figure 8B:
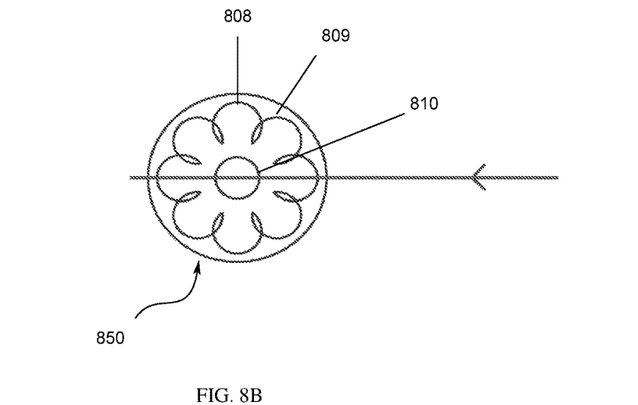

In an embodiment, FIG. 8 illustrates a system 800, which depicts an elemental splined centripetal thrust augmentation nozzle (isentropic switch) whereby the funneled vortex flux 807 is transformed into a numerocity of contrarotating (micro) spline vortices 813 that generates the (isentropical) transformed (propulsive) supersonic front 812 in accordance with the $2^{nd}$ law of thermodynamics (preservation of internal energy) whereby $dU=\delta Q+\delta W=\delta W$ given $\delta Q=0$. Referring to FIG. 8B, which illustrates a cross-sectional view 850, depicting an outer nozzle, inner nozzle and shaft structure represented by 808/809 and shaft 810 respectively.

Figure 9A:
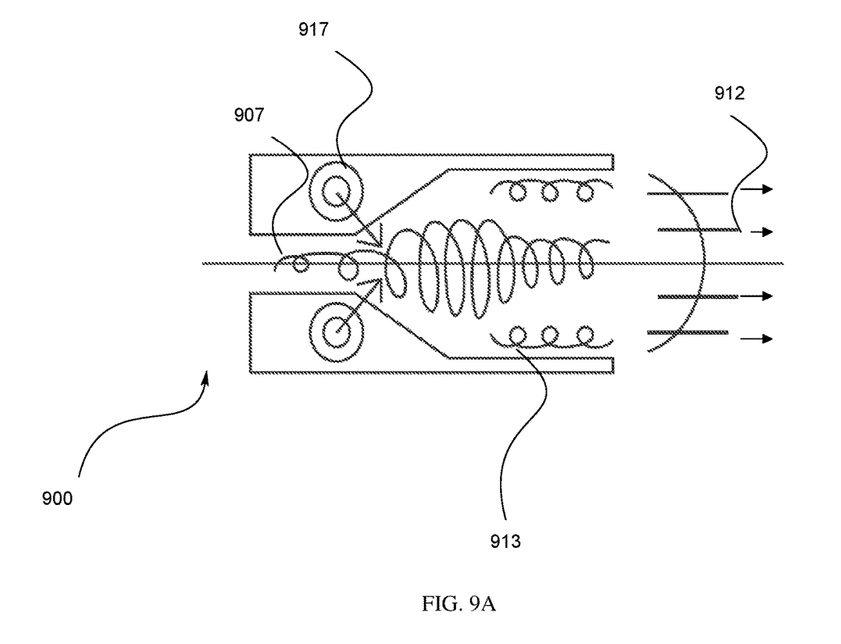
FIGS. 9A and 9B illustrates a centripetal splined supersonic-detonation thrust augmented nozzle driven by an array of hypersonic Constellation micro propellant injectors in conjunction with splined annular exit.
Figure 9B:
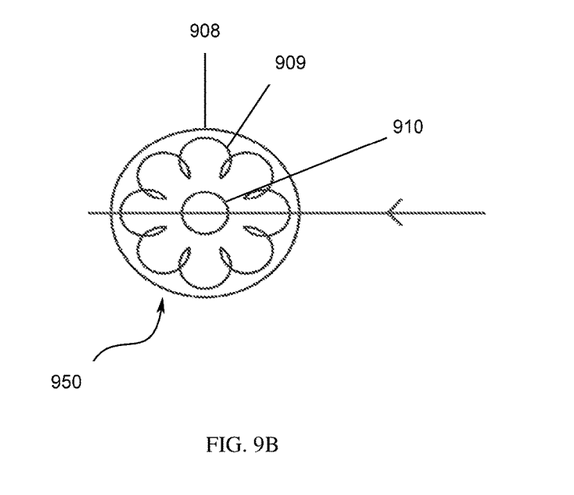

In an embodiment, FIG. 9 illustrates a system 900, which depicts an enumerated splined centripetal thrust augmentation nozzle isentropic switch whereby the funneled vortex flux 907 is transformed into a numerocity of contrarotating micro spline vortices 913 driven by an array of hypersonic Constellation (micro) propellant injectors 917 that generates the (isentropical) transformed (propulsive) supersonic front 912 in accordance with the $2^{nd}$ law of thermodynamics (preservation of internal energy) whereby $dU=\delta Q+\delta W=\delta W$ given $\delta Q=0$. Referring to FIG. 9B, which illustrates a cross-sectional view 950, depicting an outer nozzle, inner nozzle and shaft structure represented by 908/909 and shaft 910 respectively.

Figure 10:
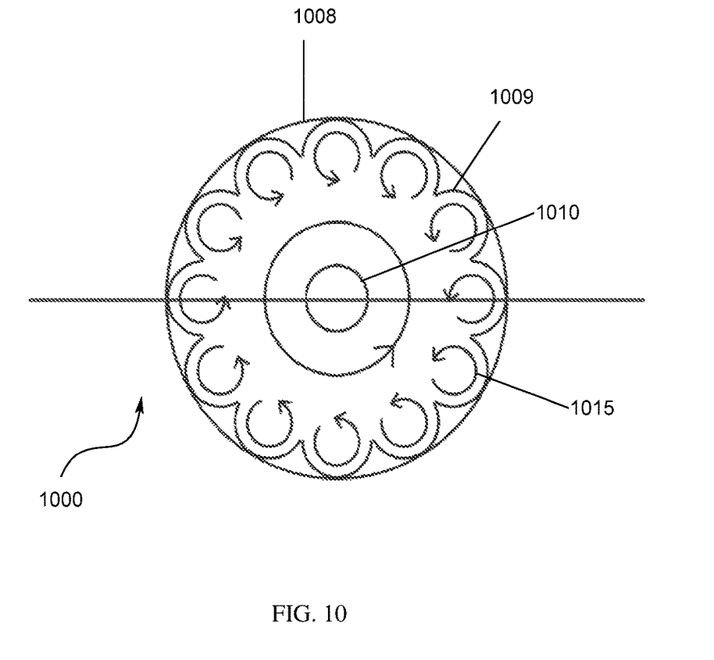
FIG. 10 illustrates the micro splines in a Z/Y-plane gear transformation.

In an embodiment, FIG. 10 depicts a planetary splines gear transmission analogy 1000, wherein 1008/1009/1010 represent the outer/inner shell and the central shaft respectively and 1015 representing the contrarotating spline vortex flux. According to design rules (1) $dU=\delta Q+\delta W=\delta Q$ [$dU=\delta Q$ with $\delta W=0$ and $dU=\delta W$ with $\delta Q=0$. Isentropic switch in accordance with the $2^{nd}$ Law of Thermodynamics (preservation of energy) and (2) the sum of the splines induced (micro/inversed) vortices YY=power of the incipient/shafted vortex.

In accordance with the First Law of Thermodynamics, conservation of energy, whereby energy can be neither created nor destroyed (1) generally and/or (2) specifically in a sudden expansion in a duct or nozzle system whereby $dU=\delta Q+\delta W=\delta Q$. Here the splinesconstitute a sudden/grooved expansion in a supersonic expansion nozzle whereby (1) micro (contra rotating) vortex streams are spawned (via sudden expansion) which mirrors the master/mother vortexflux succinctly (2) the sum total of the (micro/spline) vortices equals the incipient master/mother vortex flux (3) the micro/spline flux negates (wipes out) the incipient master/mother vortex and (4) because the operation of the $1^{st}$ Law of Thermodynamics, the (incipient) master/mother vortex flux is spatially transformed/reincarnated into (supersonic) isentropic streamlines whereby $dU=\delta Q+\delta W=\delta Q$. In event of a (regenerative) cryogenic shockwave piercing nozzle system $\underline{dU=\delta Q+\delta W=\delta Q}$ [with $\delta W=0$] and in event of an adiabatic/ceramic lined (centripetal) thrust augmentation propulsive nozzle system $\underline{dU=\delta Q+\delta W=\delta W}$ [with $\delta Q=0$].

However because the equation of state $dU=\delta Q+\delta W=\delta Q$ must be satisfied in accordance with the First Law of Thermodynamics, the supersonic splines isentropic switch functions as (1) (supercharged) Joule-Thomson refrigeration engine in the cryogenic zone and (2) supercharged (thrust augmentation) expansion nozzle whereby $dU=\delta Q$ ($\delta W=0$) with a (splined) crusonix shockwave piercing nozzle and $dU=\delta W$ ($\delta Q=0$) with a centripetal SURD (supersonic ram detonation) thrust augmentation propulsive nozzle.

In order to model the dynamics of the splines hypersonic/stochastic and supersonic/isentropic transformation computationally vector matrix power factor analogy in conformance with electrical power transmission (perfect alignment of the voltage and current vectors so as to max energy/work transmission) is being applied whereby in a purist isentropic potential field the stagnation and velocity vectors are in perfectly alignment/symmetry (to max work performed) in compliance with the 1st Law of Thermodynamics ($dU=\delta Q+\delta W=\delta W$ ($\delta Q=0$). Given that in a perfect electrical/fluidic (potential) field the current/voltage and stagnation pressure/velocity are in perfect alignment the power factor [COS($\emptyset$)] must be UNITY (i.e. $\cos(\emptyset)=1.0$) both ways. However, in event of current/voltage lead/lag and velocity/stagnation pressure divergence the power factor will be smaller than unity (i.e. $\cos(\emptyset)<1$). In order to enumerate actual (real time) splines power factor divergence actual. (cryogenic) regression [−180 C/−170 C/−150 C/−140 C/−120 C/ 23 C] (M5 stagnation pressure) data sets has been employed that rendered $\cos(\mathbf{527})=0.41/0.35/$ $0.32/0.31/0.30/0.27$ [66/70/71/72/73/74deg] as to purist (isentropic) and $\cos(\emptyset)'=0.36/0.33/0.30/0.30/0.29/0.26$ [69/71/72/73/73/75deg] as to purist stochastic/random transformation respectively.

With the power factor postulation in place backed up with and actual measured (M5) hypersonic/cryogenic stagnation transformation "regression" data, the splines isentropic transformation may be modeled by an isentropical expansion as follows:
$M=((Pr)^{0.286}-1)\times 5)^{0.5}$ generally and $Me=((Pr \times \cos(\emptyset)')^{0.286}-1)\times 5)^{0.5}$ specifically and (2) $T2=T1 \times (1+0.2Me^2)^{-1}$ consequently.

Applying the data $\cos(\emptyset)'=\cos(\emptyset)\times 0.887$, $Me=[((150\times 0.41\times 0.887)^{0.286}-1)\times 5]^{0.5}=[(3.14-1)\times 5]^{0.5}=[10.7]^{0.5}=3.3$ Conversely given $Me=3.3$, $T2=93 \times (1+0.2 \times$ $3.3^\wedge-1=93\times(2.18)^\wedge-1=93/2.18=42.7K=-230.5C$. Noteworthy is that although the exit Mach number Me=3.3 is 30% lower than the incipient (isentropic) front @M5, the Mach number impairment is minimal taking in account that (1) (regenerative/isothermal compression shockwave piercing utility and (2) turning the splines into a powerful refrigeration engine. See tabulation as to the VT3 data spread −180/−170/−150/−140−120/23C in totality.

| 1. dU = δQ + δW = δQ [with δW = 0][ISOTHERMAL] | | | | | | |
|---|---|---|---|---|---|---|
| Me/C. | −180 | −170 | −150 | −140 | −120 | 23 |
| Me/K | 93 | 103 | 123 | 133 | 153 | 296 |
| cosØ | 0.41 | 0.35 | 0.32 | 0.31 | 0.30 | 0.27 |
| Ø | 66 | 70 | 71 | 72 | 72.5 | 74 |
| R' | 8.87 | 9.53 | 9.54 | 9.57 | 9.59 | 9.66 |
| Pr | 150 | 127 | 117 | 113 | 110 | 100 |
| Me | 3.3 | 3.1 | 3.0 | 2.9 | 2.9 | 2.8 |
| Te/K | 29.7 | 35.4 | 44.3 | 48.7 | 57.0 | 116.1 |
| Te/C. | −243.3 | −237.6 | −228.7 | −224.3 | −216.0 | −156.9 |

| 2. dU = δQ + δW = δW [with δQ = 0] [ADIABATIC] | | | | | | |
|---|---|---|---|---|---|---|
| Ti/C. | −180 | −170 | −150 | −140 | −120 | 23 |
| Ti/F. | −292 | −274 | −238 | −220 | −184 | 73 |
| Ti/R | 168 | 186 | 222 | 240 | 276 | 533 |
| Qpr | 20000 | 20000 | 20000 | 20000 | 20000 | 20000 |
| Apr | 12 | 12 | 12 | 12 | 12 | 12 |
| Qpr' | 1667 | 1667 | 1667 | 1667 | 1667 | 1667 |
| ΔTpr' | 6667 | 6667 | 6667 | 6667 | 6667 | 6667 |
| Tmax/F. | 5000 | 5000 | 5000 | 5000 | 5000 | 5000 |
| Qstoich | 0.75 | 0.75 | 0.75 | 0.75 | 0.75 | 0.75 |
| Rstoich | 30 | 27 | 23 | 21 | 18 | 9 |
| Me | 12.0 | 11.4 | 10.4 | 10.0 | 9.3 | 6.5 |
| Isec | 3,769 | 3,581 | 3,195 | 3,031 | 2,742 | 1,593 |
| | 12.0 | 11.4 | 10.4 | 10.0 | 9.3 | 6.5 |
| | 29.7 | 35.4 | 44.3 | 48.7 | 57.0 | 116.1 |

As for work performed the nominal splines isentropically expanded Mach number Me=3.3/3.1/3.0/2.9/2.9/2.8 respectively. However, in event of SURD (supersonic ram combustion) the exit Mach number is boosted in conformance with $1^{st}$ law of Thermodynamics to Me'=12/11.4/10.4/10/9.3/6.5 respectively in accordance with the enumerated spreadsheet.

In a preferred embodiment, a thermally reactive nosecone mounted on a projectile for achieving hypersonic transport is described. Wherein an incipient shockwave is transformed into an isentropic flux via a stochastic switch. The stochastic switch is a singularity switch whereby a linear continuum is transformed into a gyrating stagnation flux and the singularity is a consequence of isothermal compression and hypersonic liquefaction of the incipient shockwave onto the thermally reactive nosecone. The isothermal compression and hypersonic liquefaction is achieved via regenerative cooling of the thermally reactive nosecone.

In a preferred embodiment, the singularity/isothermal compression transforms the insipient hypersonic streamlines into a harmonic stochastic vortex flux. wherein isothermal compression of the thermally reactive nosecone is achieved via regenerative cooling of the thermally reactive nosecone via Joule-Thomson throttling and complex cryogenic Carnot refrigeration. Wherein Joule-Thomson throttling and complex Carnot refrigeration is triggered via sudden expansion and/or a porous plug integrated into the discharge end of the thermally reactive nosecone. Wherein Joule-Thomson throttling and complex Carnot refrigeration is triggered via grooved isentropic splines (in lieu of the porous plug) inside the nozzle of the thermally reactive nosecone. with grooved isentropic splines that transform the vortex flux into isentropic streamlines.

In a preferred embodiment, the isentropic switch is integrated onto a discharge and/or peripheral of the thermally reactive nosecone is described. wherein an extrinsic cryogenic resource is applied to precool the thermally reactive nosecone in addition to the stochastic switched hypersonic stagnation front to supercharge the switching power of the shockwave piercing stochastic switch. Wherein the extrinsic cryogenic resource to supercharge the switching power of the shockwave piercing stochastic switch is liquid nitrogen and/or a liquid cryogenic propellant. The thermally reactive nosecone is optimized for throttling and triggering complex Carnot refrigeration liquefaction of atmospheric oxygen to drive a rocket propulsion engine of a hypersonic transport. wherein an isentropic hypersonic expansion nozzle is applied to drive the thermally reactive nosecone as a cryogenic refrigeration apparatus. wherein the isentropic hypersonic expansion nozzle of the thermally reactive nosecone is optimized to distill liquid helium. wherein hydrogen in the range of 1-5% of helium is introduced into the isentropic expansion nozzle to boost the liquefaction capacity of liquid helium. wherein liquid helium is directly distilled out of compressed helium. A freestanding thermally reactive nosecone comprising of isentropic hypersonic expansion nozzle wherein liquid helium is directly distilled out of compressed helium.

In a preferred embodiment, a freestanding thermally reactive nosecone comprising of isentropic hypersonic expansion nozzle with isentropic splines is described. Wherein liquid helium is directly distilled out of compressed helium. which is scaled as a personal helium distillation plant driven by tanked and compressed Helium and Liquid Nitrogen. which is scaled as an enterprise Liquid Helium production facility with Liquid Nitrogen and with the addition of Hydrogen. Which is scaled as an enterprise Liquid Helium production facility without Liquid Nitrogen and without the addition of Hydrogen. which is scaled as an enterprise Liquid Helium production facility with Liquid Nitrogen and with the addition of Hydrogen. which is scaled as an enterprise Liquid Helium production facility without Liquid Nitrogen without the addition of Hydrogen. Wherein the thermally reactive nosecone is coupled within the confinements of rocket missile and/or aerospace plane with a centripetal thrust augmentation nozzle. the centripetal thrust augmentation nozzle is equipped with grooved isentropic splines that transform the vortex flux into isentropic streamlines. the grooved isentropic splines centripetal thrust augmentation nozzle is equipped with enumerated supersonic ram detonation (SURD) propulsive means in addition to grooved isentropic splines in isolation.

In a preferred embodiment, a double/isentropic switch adaptation of the stochastic switch comprising of a supersonic isentropic splines switch, a planetary splines switches, an incipient stochastic vortex, a contrarotating splines vortices, a transformed/switched isentropic jet is described.

The invention claimed is:
1. An apparatus for achieving hypersonic transport for an airspace plane comprising:
   a thermally reactive nosecone; and
   a nozzle with a grooved splined structure.
2. The apparatus as described in claim 1, wherein the grooved spline structure is on an interior surface of the thermally reactive nosecone.

3. The apparatus as described in claim 1, wherein the grooved spline structure is on a peripheral surface of the thermally reactive nosecone.

\* \* \* \* \*